United States Patent
Yagi et al.

(10) Patent No.: US 9,340,039 B2
(45) Date of Patent: May 17, 2016

(54) PRINTER, PRINTING METHOD, OPTICAL FIBER AND OPTICAL FIBER CABLE

(71) Applicant: FUJIKURA LTD., Tokyo (JP)

(72) Inventors: Shota Yagi, Sakura (JP); Mizuki Isaji, Sakura (JP); Ken Osato, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/760,390

(22) PCT Filed: Dec. 24, 2013

(86) PCT No.: PCT/JP2013/084475
§ 371 (c)(1),
(2) Date: Jul. 10, 2015

(87) PCT Pub. No.: WO2014/109222
PCT Pub. Date: Jul. 17, 2014

(65) Prior Publication Data
US 2015/0352861 A1   Dec. 10, 2015

(30) Foreign Application Priority Data

Jan. 11, 2013   (JP) .................................. 2013-003067

(51) Int. Cl.
*B41J 2/175* (2006.01)
*B41J 3/407* (2006.01)
*B41F 17/10* (2006.01)
*G02B 6/44* (2006.01)

(52) U.S. Cl.
CPC .............. *B41J 3/4073* (2013.01); *B41F 17/10* (2013.01); *B41J 2/175* (2013.01); *G02B 6/4482* (2013.01); *G02B 6/448* (2013.01)

(58) Field of Classification Search
CPC .......... B41J 3/4073; B41J 2/175; B41F 17/10; G02B 6/4482; G02B 6/448
See application file for complete search history.

(56) References Cited

U.S. PATENT DOCUMENTS

| 5,119,464 A | * | 6/1992 | Freychet | .............. | C03C 25/104 |
|  |  |  |  |  | 347/2 |
| 2012/0189954 A1 | * | 7/2012 | Horiba | ..................... | G03G 9/13 |
|  |  |  |  |  | 430/117.1 |

FOREIGN PATENT DOCUMENTS

| JP | 61-160934 U | 10/1986 |
| JP | 62-134612 A | 6/1987 |
| JP | 2-124619 U | 10/1990 |
| JP | 3-92317 U | 9/1991 |

(Continued)

OTHER PUBLICATIONS

International Search Report for PCT/JP2013/084475 dated Mar. 4, 2014.

(Continued)

*Primary Examiner* — Juanita D Jackson
(74) *Attorney, Agent, or Firm* — Sughrue Mion, PLLC

(57) ABSTRACT

A printer for printing on an optical fiber includes an ink tray storing an ink; a drawing roll configured to draw the ink from the ink tray; a printing roll, having a print pattern which is capable of filling the ink transferred from the drawing roll, configured to transfer the ink filled in the print pattern to a surface of the running optical fiber, the print pattern being a mesh pattern having a mesh size in a range of 75-mesh to 150-mesh; and a doctor blade configured to press the ink into the print pattern and to scrape the excess ink deposited on a surface of the printing roll.

8 Claims, 6 Drawing Sheets

(56) References Cited

FOREIGN PATENT DOCUMENTS

| | | |
|---|---|---|
| JP | 9-171726 A | 6/1997 |
| JP | 2004-1444 A | 1/2004 |
| JP | 2005-123041 A | 5/2005 |
| JP | 2008-41574 A | 2/2008 |
| JP | 2011-011532 A | 1/2011 |

OTHER PUBLICATIONS

Japanese Office Action for JP 2013-003067 dated Sep. 2, 2014.
Communication dated Sep. 29, 2015 from the Japanese Patent Office in counterpart application No. 2015-041447.

* cited by examiner

FIG. 9

| Sample | Mesh Size | Print Angle | Ink Leakage | Visibility | Overall Determination |
|---|---|---|---|---|---|
| 1 | 200-mesh | about 10° | Absence | × | × |
| 2 | 175-mesh | about 20° | Absence | × | × |
| 3 | 150-mesh | about 40° | Absence | ○ | ○ |
| 4 | 133-mesh | about 100° | Absence | ○ | ○ |
| 5 | 100-mesh | about 130° | Absence | ○ | ○ |
| 6 | 75-mesh | about 140° | Absence | ○ | ○ |
| 7 | 50-mesh | about 145° | Presence | ○ | × |
| 8 | W/O mesh | × | Presence | ○ | × |

FIG. 10

| Sample | Linear Velocity (m/min) | Number of Core | Ink Leakage | Visibility |
|---|---|---|---|---|
| 1 | 100 | 1 | Absence | ○ |
| 2 | 100 | 4 | Absence | ○ |
| 3 | 100 | 8 | Absence | ○ |
| 4 | 100 | 12 | Absence | ○ |
| 5 | 200 | 1 | Absence | ○ |
| 6 | 200 | 4 | Absence | ○ |
| 7 | 200 | 8 | Absence | ○ |
| 8 | 200 | 12 | Absence | ○ |
| 9 | 400 | 1 | Absence | ○ |
| 10 | 400 | 4 | Absence | ○ |
| 11 | 400 | 8 | Absence | ○ |
| 12 | 400 | 12 | Absence | ○ |

PRINTER, PRINTING METHOD, OPTICAL FIBER AND OPTICAL FIBER CABLE

TECHNICAL FIELD

The present invention relates to a printer, a printing method, an optical fiber and an optical fiber cable.

BACKGROUND ART

As a printing (marking) method for identifying an optical fiber ribbon, an inkjet printing that carries out the marking by using an inkjet printer is known (for example, refer to Patent Document 1).

In the inkjet printing, since there is a limit for high speed printing with one inkjet printer, when increasing linear velocity of the optical fiber, it is necessary to install several ink jet printers in series. Also, in the marking using the inkjet printer, a number of inkjet printers are increased as a current measure to conduct simultaneously the printing by laying the optical fiber ribbon having four core wires or twelve core wires side-by-side, and thus the production cost may increase.

Also, as another printing method, a roll printing that uses a printing roll is known (for example, refer to Patent Document 2).

PRIOR ART DOCUMENT

Patent Document

[Patent Document 1] JP 2005-123041A
[Patent Document 2] JP 2011-011532A

DISCLOSURE OF INVENTION

However, in the case of the roll printing, it is difficult to implement the marking on a linear body having a diameter of 1 mm or less, such as the optical fiber core wire, by the roll printing with high visibility. For this reason, the roll print has not been performed on the linear body having a diameter of 1 mm or less.

An object of the present invention is to provide a printer, a printing method, an optical fiber and an optical fiber cable, capable of performing marking on the optical fiber at high speed with high visibility.

An aspect of the present invention provides a printer for printing on an optical fiber including an ink tray storing an ink; a drawing roll configured to draw the ink from the ink tray; a printing roll, having a print pattern which is capable of filling the ink transferred from the drawing roll, configured to transfer the ink filled in the print pattern to a surface of the running optical fiber, the print pattern being a mesh pattern having a mesh size in a range of 75-mesh to 150-mesh; and a doctor blade configured to press the ink into the print pattern and to scrape the excess ink deposited on a surface of the printing roll.

Another aspect of the present invention provides a printing method on an optical fiber including drawing an ink from an ink tray using an drawing roll; transferring the ink drawn by the drawing roll to a printing roll having a print pattern, the print pattern being a mesh pattern having a mesh size in a range of 75-mesh to 150-mesh; pressing the ink into the print pattern and also scraping the excess ink deposited on a surface of the printing roll; and transferring the ink filled in the print pattern to a surface of the running optical fiber.

Yet another aspect of the present invention provides an optical fiber produced by using a printing method on the optical fiber including drawing an ink from an ink tray using an drawing roll; transferring the ink drawn by the drawing roll to a printing roll having a print pattern, the print pattern being a mesh pattern having a mesh size in a range of 75-mesh to 150-mesh; pressing the ink into the print pattern and also scraping the excess ink deposited on a surface of the printing roll; and transferring the ink filled in the print pattern to a surface of the running optical fiber.

Yet another aspect of the present invention provides an optical fiber cable implementing an optical fiber produced by using a printing method on the optical fiber including drawing an ink from an ink tray using an drawing roll; transferring the ink drawn by the drawing roll to a printing roll having a print pattern, the print pattern being a mesh pattern having a mesh size in a range of 75-mesh to 150-mesh; pressing the ink into the print pattern and also scraping the excess ink deposited on a surface of the printing roll; and transferring the ink filled in the print pattern to a surface of the running optical fiber.

According to the present invention, it is possible to provide the printer, the printing method, the optical fiber and the optical fiber cable, capable of performing marking on the optical fiber at high speed with high visibility.

BRIEF DESCRIPTION OF DRAWINGS

FIG. 9 is a table presenting an example of experimental results according to a first example of the embodiment of the present invention;

FIG. 10 is a table presenting an example of experimental results according to a second example of the embodiment of the present invention.

DESCRIPTION OF EMBODIMENTS

Figure 1:
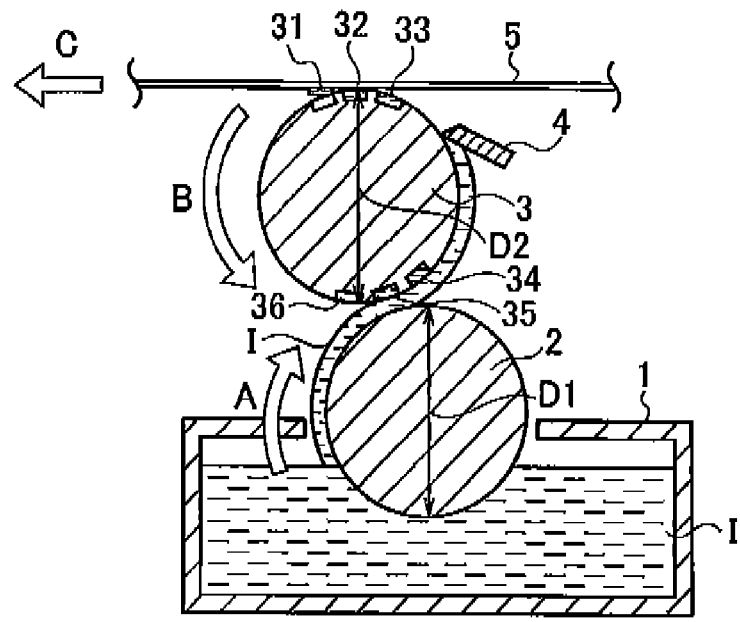
FIG. 1 is a cross-sectional view illustrating an example of a printer according to an embodiment of the present invention (a cross-sectional view taken along line A-A in FIG. 2)

Various embodiments of the present invention will be described with reference to the accompanying drawings. In the following description of the drawings, same or similar parts are given same or similar reference numerals. However, it is noted that the drawings are schematic and that the relationship between thickness and planar dimensions, the proportion of thicknesses of layers, and the like are different from real ones. Accordingly, specific thicknesses and dimensions should be determined with reference to the following description. It is certain that some portions have different dimensional relations and proportions between the drawings.

Also, the following embodiments show devices and methods to embody the technical idea of the invention by way of example. The technical ideas of the invention do not limit the materials, shapes, structures, arrangements, and the like of the constituent components to those described below. The technical idea of the invention can be variously changed within the scope of the claims.

(Printer)

Figure 2:
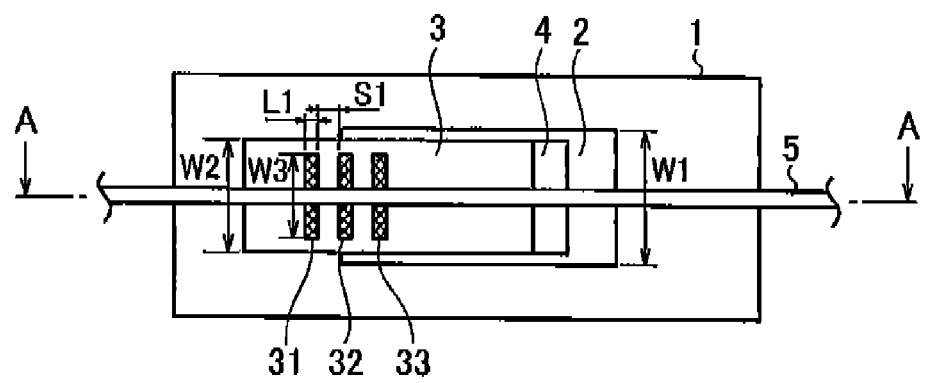
FIG. 2 is a top view illustrating an example of the printer according to the embodiment of the present invention.

A printer according to the embodiment of the present invention may implement printing (marking) on a linear body having a diameter of 1 mm or less, such as an optical fiber and the like. As shown in FIGS. 1 and 2, the printer according to the embodiment of the present invention includes an ink tray 1 for storing an ink I, a drawing roll 2 partially immersed in the ink I in the ink tray 1, a printing roll 3 disposed adjacent to the drawing roll 2, and a doctor blade 4 being in contact with the printing roll 3.

When printing to an optical fiber 5, the drawing roll 2 rotates in a direction indicated by the arrow A and draws the ink I. On the other hand, the printing roll 3 rotates in a direction indicated by the arrow B which is opposite to the rotation direction of the drawing roll 2, so as to transfer the ink I drawn by the drawing roll 2. The doctor blade 4 scrapes the excess ink I deposited on the printing roll 3 and also presses the ink I into print patterns 31 to 36 formed on the printing roll 3. The inks I filled in the print patterns 31 to 36 are transferred to the optical fiber 5 which is running on the printing roll 3 in a direction indicated by the arrow C, and the marking is consequently performed.

The diameter of the optical fiber 5, which is a marking target, is 1 mm or less, for example, about 0.25 mm. For the optical fiber 5, an optical fiber wire, an optical fiber core wire, an optical fiber ribbon, or the like, may be adopted. For the optical fiber ribbon, for example, an optical fiber ribbon of an intermittently fixed type, and the like, may be used. In the embodiment of the present invention, the number, kind, size, and the like, of the optical fibers 5 are not particularly limited. In a case of a plurality of optical fibers 5, one printing roll 3 can be used to perform the marking together in parallel. A running speed (linear velocity) of the optical fiber 5 may be about 100 m/min to 800 m/min. The optical fiber 5, which may be in contact with or non-contact with the printing roll 3, may run so as not to be rubbed by the printing roll 3, and to transfer the ink I from the printing roll 3.

Viscosity of the ink I in the ink tray 1 is in a range of about 1 mPa·s to about 2000 Pa·s (the range in which water and UV curable ink may be included). For the drawing roll 2 and the printing roll 3, each of diameters D1 and D2 may be about 100 mm, and each of widths W1 and W2 may be about 50 mm. The drawing roll 2 and the printing roll 3 are arranged in non-contact with each other and in positions where the ink I may be transferred by surface tension. The rotation speed of the printing roll 3 is properly set depending on the running speed (linear velocity) of the optical fiber 5. The rotation speed of the drawing roll 2, which may be slower than the rotation speed of the printing roll 3, is properly set.

The print patterns 31 to 33 are provided on the printing roll 3. A length L1, which is parallel to a rotation direction of the print patterns 31 to 33, is in a range of about 1 mm to about 50 mm, and a width W3, which is orthogonal to the rotation direction, is in a range of about 1 mm to about 50 mm. An interval S1 between the print patterns 31 and 33 is in a range of about 1 mm to about 50 mm. In addition, shapes of the print patterns 31 to 36 are not limited to a rectangle, respectively.

As shown in FIG. 1, the print patterns 34 to 36 having the similar structure as the printing patterns 31 to 33 are provided at an opposite side of the print patterns 31 to 33, in a circumferential direction of the printing roll 3. In addition, although the case in which three print patterns 31 to 33 and the three print patterns 34 to 36 are provided at the opposite side to each other on the printing roll 3 has described in FIG. 1, the number and size of the print patterns 31 to 36, and the arrangement positions on the printing roll 3 are not particularly limited.

Figure 3:
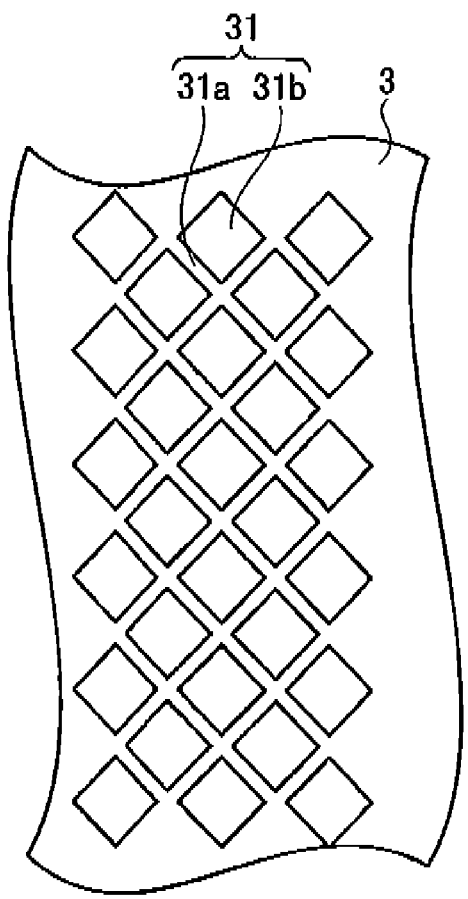
FIG. 3 is a top view illustrating an example of a print pattern according to the embodiment of the present invention.
Figure 4:
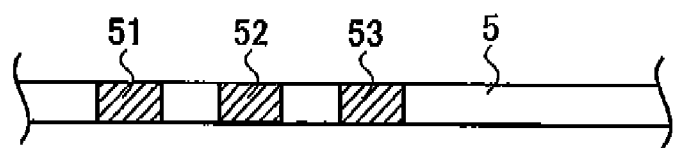
FIG. 4 is a top view illustrating an example of an optical fiber after marking according to the embodiment of the present invention.

The print pattern 31 is a mesh pattern as shown in FIG. 3 and has a convex portion 31a intersecting like as a mesh, and rhombic (quadratic) groove portions (concave portions) 31b. A depth of the groove portion 31b is, for example, in a range of about 5 μm and 50 μm. The inks I filled in the groove portions 31b are brought into contact with a surface of the optical fiber 5 and deposited on the optical fiber 5. The inks I deposited on the surface of the optical fiber 5 are joined each other by flowing on the surface of the optical fiber 5, and ink layers 51 to 53 corresponding to the print patterns 31 to 33, respectively, are formed as shown in FIG. 4. In addition, the respective print patterns 32 to 36 shown in FIGS. 1 and 2 have the similar configuration as the print pattern 31 shown in FIG. 4.

The print patterns 31 to 36 may be formed, for example, by pressing against the surface of the printing roll 3 using a processing roll having a pattern for forming the print patterns 31 to 36, or by performing laser processing, or by etching using a resist pattern as a mask.

Each mesh size of the print patterns 31 to 36 is provided in a range of 75-mesh to 150-mesh, and more preferably in a range of 75-mesh to 133-mesh. Note that, [mesh] represents a number of meshes per inch.

Figure 5:
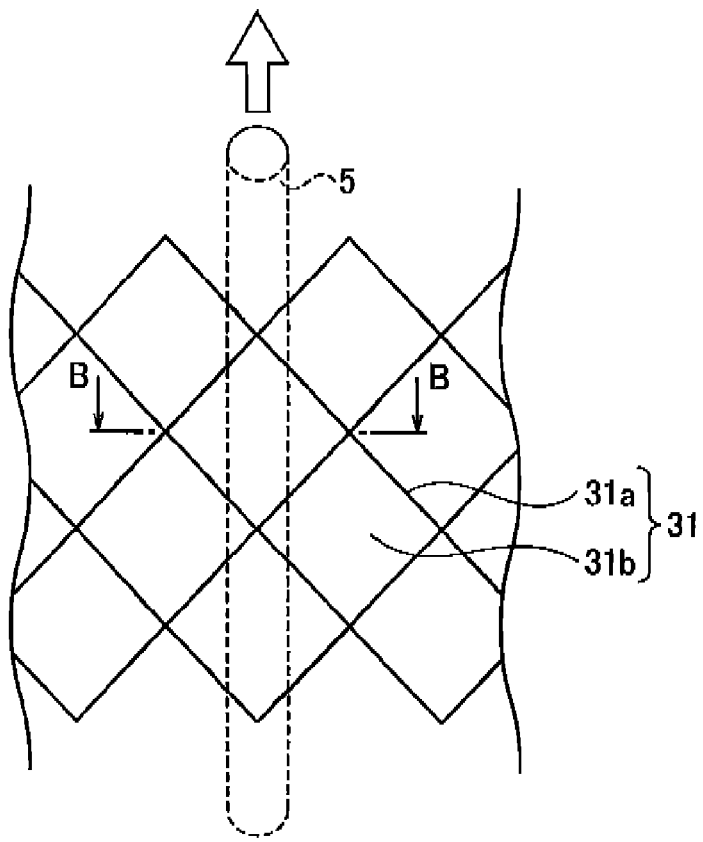
FIG. 5 is a schematic view illustrating an example of the print pattern according to the embodiment of the present invention.

In FIG. 5, the convex portion 31a of the print pattern 31 is schematically shown by solid lines, and the optical fiber 5 running in an arrow direction is shown by a dotted line. In FIG. 5, although the optical fiber 5 is running on the print pattern 31 so as to pass through intersections of the meshes of the convex portion 31a, the running position of the optical fiber 5 are not limited to them.

Figure 6:
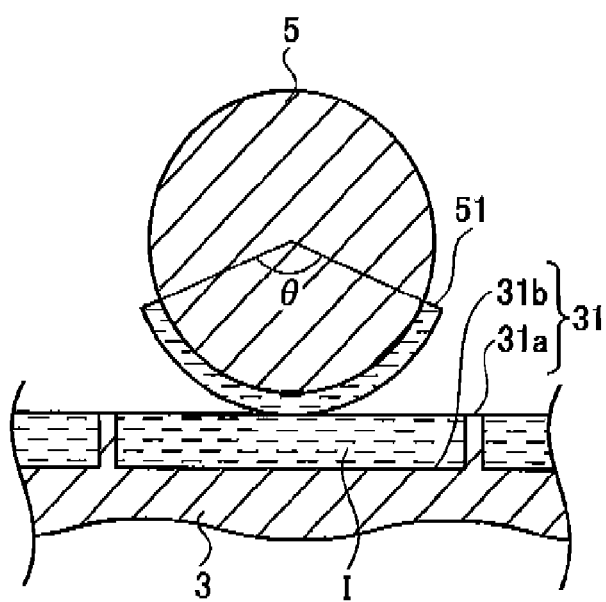
FIG. 6 is a cross-sectional view taken along line B-B in FIG. 5.

As roughening the mesh of the print pattern 31, a surface area of the ink I in one mesh may increase, as shown in FIG. 5, and an amount of the ink which deposits on the optical fiber 5 by the surface tension may increase. As a result, as shown in FIG. 6, an angle (hereafter, also referred to as "print angle") θ with which the ink layer 51 is formed in the circumferential direction of the optical fiber 5 may increase, and high visibility of the marking may be obtained. However, when the mesh size exceeds 150-mesh, the ink I may be leaked from the print pattern 31, and thus the ink I may be deposited on a position other than the marking position of the optical fiber 5. Consequently, the visibility may be degraded.

Figure 7:
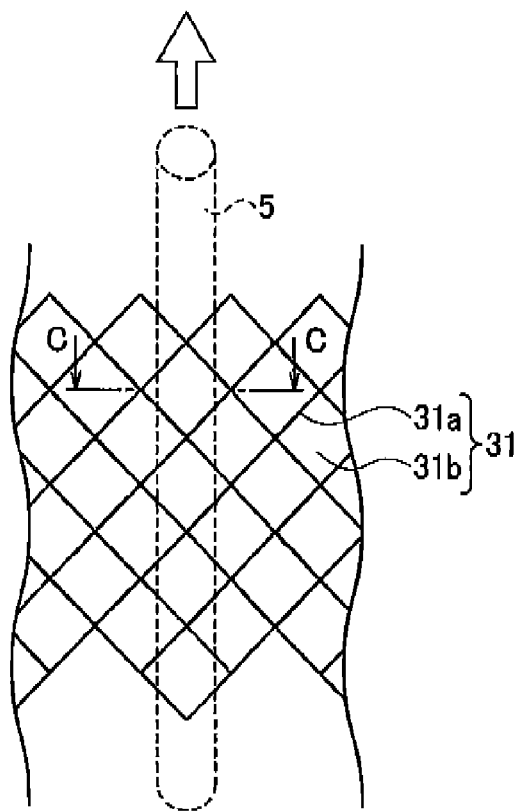
FIG. 7 is a schematic view illustrating another example of the print pattern according to the embodiment of the present invention.
Figure 8:
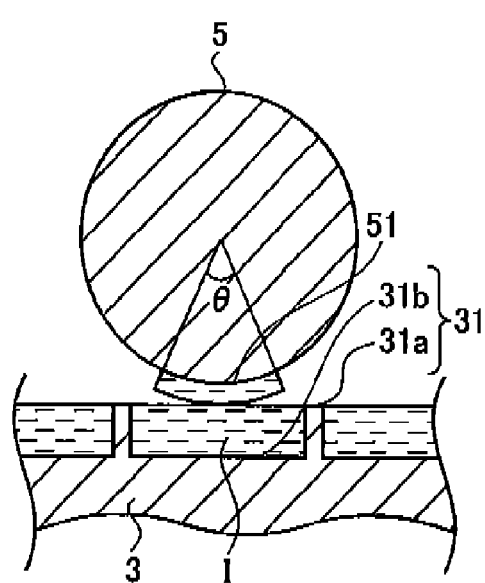
FIG. 8 is a cross-sectional view taken along line C-C in FIG. 7.

On the other hand, when the mesh size decreases, the surface area of the ink I in one mesh may decrease, and the amount of the ink deposited on the optical fiber 5 may decrease. FIG. 7 shows a case in which the mesh size is smaller as compared with FIG. 5, and the convex portion 31a of the print pattern 31 is schematically shown by solid lines, and the optical fiber 5 running in an arrow direction is shown by a dotted line. When the mesh size may decrease, the print angle θ may decrease, as shown in FIG. 8. Here, when the mesh size is smaller than 75-mesh, the print angle θ may become extremely small, and thus the visibility of the marking may be degraded.

Therefore, by providing each mesh size of the print patterns 31 to 36 in a range of 75-mesh to 150-mesh, it is possible to prevent leakage of the ink from the print patterns 31 to 36, and to achieve the marking with high visibility.

(Printing Method)

An example of a printing method (marking method) to the optical fiber 5 according to the embodiment of the present invention will be described below.

(a) The ink I is drawn by rotating the drawing roll 2 shown in FIGS. 1 and 2 in the direction indicated by the arrow A.

(b) The ink I is transferred from the drawing roll 2 to the printing roll 3 by rotating the printing roll 3 on which the print patterns 31 to 36 each having the mesh size in a range of 75-mesh to 150-mesh are provided, in the direction indicated by the arrow B.

(c) The doctor blade 4 presses the ink I into the groove portions 31b of the print patterns 31 to 33 provided on the printing roll 3 and also scrapes the excess ink I deposited on the surface of the printing roll 3.

(d) The ink I filled in each of the groove portions 31b of the print patterns 31 to 33 provided on the printing roll 3 are transferred to the optical fiber 5 running in the direction indicated by the arrow C.

According to the printer and the printing method according to the embodiment in the present invention, by the roll printing for performing the marking on the optical fiber 5, it is possible to perform the marking at high speed as compared with the inkjet printing, without any increase of a number of units as in the case of the inkjet printing.

Moreover, even on a plurality of optical fibers 5, it is possible to perform simultaneously the marking in parallel, without any increase of a number of the units as in the case of the inkjet printing.

Furthermore, by using the printing roll 3 of the print patterns 31 to 36 each having the mesh size in a range of 75-mesh to 150-mesh, it is possible to obtain high visibility of the marking.

FIRST EXAMPLE

As a first example, samples 1 to 8 have been prepared by performing the marking on optical fiber wires having a diameter of 250 μm, by using seven kinds of printing rolls having different mesh sizes; and a printing roll having no mesh. The running speed of the optical fiber wire has been 400 m/min. A diameter and a width of each printing roll has been 100 mm and 15 mm, respectively. As the ink, a mixture of VS5990 made by Dainichiseika Color & Chemicals Mfg Co., Ltd and a solvent VS1000 at a rate of 2:1 has been used The ink leakage and the visibility have been evaluated by measuring the print angles using the produced samples 1 to 8. FIG. 9 shows the experimental results. In FIG. 9, the print angle indicates an angle of the marking on a circumference of a cross-section of the optical fiber wire. With regard to the ink leakage, presence or absence of the ink leakage has been determined by visually observing the samples 1 to 8 after the marking. With regard to the visibility, 10 persons have checked, and the case where everyone has determined to be easy to identify the sample 1 to 8 by the marking, has been decided as "o", and the other case has been decided as "x". Moreover, as overall determination, the case where the ink leakage has been absence and the visibility has been high, has been decided as "o", and the case where the ink leakage has been presence or the visibility has been poor, has been decided as "x".

From FIG. 9, it can be seen that, as the mesh size becomes rougher, the print angle increases. And in the sample 1 or 2, with the mesh size of 175-mesh or 200-mesh, the print angle has been 20° or less, and the visibility has been deteriorated due to narrowness of print area. On the other hand, in the sample 7 or 8 with the mesh size of 50-mesh or without mesh, the ink leakage has occurred, and, since the marking has been made at a position other than the target position, the visibility has been deteriorated.

SECOND EXAMPLE

As a second example, samples 1 to 12 have been prepared by performing the marking by changing running speed (linear velocity) and a number of cores of the optical fiber wire having a diameter of 250 μm. The mesh size of the print pattern has been 133-mesh. A diameter and a width of each printing roll has been 100 mm and 55 mm, respectively. As the ink, a mixture of VS5990 made by Dainichiseika Color & Chemicals Mfg Co., Ltd and a solvent VS1000 at a rate of 2:1 has been used.

Using the produced samples 1 to 12, the ink leakage and the visibility have been evaluated similarly to the first example. FIG. 10 shows the experimental results. As shown in FIG. 10, the ink leakage has not occurred in the range of one core to twelve cores and with the linear velocity in the range of 100 m/min to 400 m/min, and the high visibility has been obtained.

(Other Embodiment)

The present invention has been described through the embodiment as mentioned above. However the descriptions and drawings that constitute a portion of this disclosure should not be perceived as limiting this invention. Various alternative embodiments and operational techniques will become clear to persons skilled in the art from this disclosure.

For example, the printer according to the embodiment of the present invention is not limited to the configuration shown in FIG. 1, and at least the printing roll 3 may have the print patterns 31 to 36 each having the mesh size in a range of 75-mesh to 150-mesh.

Figure 11:
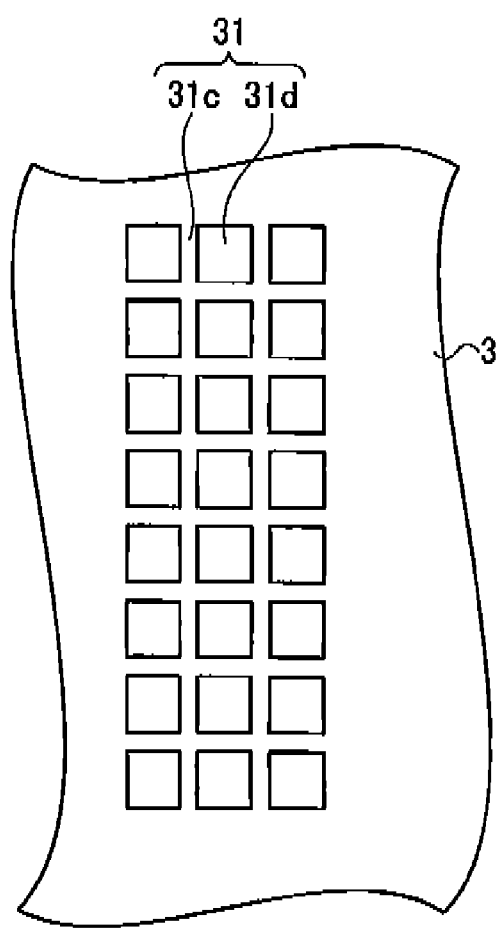
FIG. 11 is a top view illustrating an example of a printing roll according to other embodiment of the present invention.

Also, each rhombic shape of the groove portions 31b in the print patterns 31 to 36 is not limited to the quadratic pattern having four corners of 90°, the four corners may be a combination of acute and obtuse angles. Also, as the rhombic shape forming each mesh of the print patterns 31 to 36, a pattern in which each side is located in an oblique direction with respect to the rotation direction of the printing roll 3 is provided. However, the pattern is not particularly limited to the above. For example, as shown in FIG. 11, a shape of a concave portion 31d forming the print pattern 31 may be designed so that the two sides opposite to each other are located in parallel to the rotation direction of the printing roll 3 and the other two sides are located orthogonally. Further, openings of the concave portion 31b of the print patterns 31 to 36 may be rhombic, alternatively a three-dimensional shape of the concave portion 31b may be a square pillar (cube or rectangular parallelepiped) or a triangular pillar.

Further, it is possible to produce a mounted optical fiber cable by implementing the optical fiber 5 according to the embodiment of the present invention covered with an exterior cover (sheath). A kind of the optical fiber cable is not particularly limited, and it is possible to apply to a slot-less type optical fiber cable or a slot type optical fiber cable, such as an SZ slot type optical fiber cable, a tape slot type optical fiber cable, or the like.

Also, instead of the optical fiber 5 according to the embodiment of the present invention, it is possible to use a linear body, such as a normal electric cable, a wire, and the like, having a diameter of 1 mm or less.

Furthermore, the printer according to the embodiment of the present invention can perform the printing on the linear body, such as the optical fiber 5 and the like, and also can perform the printing on a sheet and the like other than the linear body.

In this manner, the present invention naturally includes various embodiments not specifically mentioned herein. Accordingly, the technical scope of the present invention may be limited only by the inventive features set forth by the scope of the patent claims deemed reasonable from the above description.

Industrial Applicability

The present invention can be applied to the printer, the printing method, the optical fiber and the optical fiber cable, capable of performing marking on the optical fiber at high speed with high visibility.

The invention claimed is:

1. A printer for printing on an optical fiber comprising:
an ink tray storing an ink;
a drawing roll configured to draw the ink from the ink tray;
a printing roll, having a print pattern which is capable of filling the ink transferred from the drawing roll, configured to transfer the ink filled in the print pattern to a surface of a running optical fiber; and
a doctor blade configured to press the ink into the print pattern and to scrape the excess ink deposited on a surface of the printing roll,
wherein the drawing roll and the printing roll are arranged in non-contact with each other, and
a rotation speed of the drawing roll is slower than a rotation speed of the printing roll.

2. The printer of claim 1, wherein the print pattern is a mesh pattern having a mesh size in a range of 75-mesh to 150-mesh.

3. A printing method on an optical fiber comprising:
drawing an ink from an ink tray using an drawing roll;
transferring the ink drawn by the drawing roll to a printing roll having a print pattern, the printing roll being arranged in non-contact with the drawing roll;
pressing the ink into the print pattern and also scraping the excess ink deposited on a surface of the printing roll; and
transferring the ink filled in the print pattern to a surface of a running optical fiber,
wherein a rotation speed of the drawing roll is slower than a rotation speed of the printing roll.

4. The printing method of claim 3, wherein the print pattern is a mesh pattern having a mesh size in a range of 75-mesh to 150-mesh.

5. The printing method of claim 4, wherein the print pattern is a mesh pattern having a mesh size in a range of 75-mesh to 150-mesh.

6. A printer for printing on an optical fiber comprising;
an ink tray storing an ink;
a drawing roll configured to draw the ink from the ink tray;
a printing roll, having a print pattern which is capable of filling the ink transferred from the drawing roll, configured to transfer the ink filled in the print pattern to a surface of a running optical fiber; and
a doctor blade configured to press the ink into the print pattern and to scrape the excess ink deposited on a surface of the printing roll,
wherein the drawing roll and the printing roll are arranged in non-contact with each other, and
a circumferential speed of the drawing roll is slower than a circumferential speed of the printing roll.

7. The printer of claim 6, wherein the print pattern is a mesh pattern having a mesh size in a range of 75-mesh to 150-mesh.

8. A printing method on an optical fiber comprising:
drawing an ink from an ink tray using an drawing roll;
transferring the ink drawn by the drawing roll to a printing roll having a print pattern, the printing roll being arranged in non-contact with the drawing roll;
pressing the ink into the print pattern and also scraping the excess ink deposited on a surface of the printing roll; and
transferring the ink filled in the print pattern to a surface of a running optical fiber,
wherein a circumferential speed of the drawing roll is slower than a circumferential speed of the printing roll.

* * * * *